United States Patent [19]

Greene

[11] Patent Number: 5,215,663
[45] Date of Patent: Jun. 1, 1993

[54] EASILY REPLACEABLE ROTOR MEMBRANE PACK

[75] Inventor: William A. Greene, Gardena, Calif.

[73] Assignee: Aquatechnology Resource Management, Inc., Long Beach, Calif.

[21] Appl. No.: 843,935

[22] Filed: Feb. 11, 1992

[51] Int. Cl.$^5$ ............................................. B01D 63/16
[52] U.S. Cl. ................. 210/634; 210/321.68; 210/330; 210/347
[58] Field of Search ............... 210/634, 641, 644, 649, 210/650, 232, 234, 322, 323.1, 324, 330, 331, 340, 341, 345–347, 321.68, 321.67

[56] References Cited

U.S. PATENT DOCUMENTS

| | | |
|---|---|---|
| 3,669,879 | 6/1972 | Berriman . |
| 3,879,286 | 4/1975 | Berriman . |
| 4,025,425 | 5/1977 | Croopnick et al. . |
| 4,132,649 | 1/1979 | Croopnick et al. . |
| 4,246,108 | 1/1981 | Croopnick et al. . |
| 4,557,836 | 12/1985 | Croopnick et al. . |
| 4,576,715 | 3/1986 | Michaels et al. . |
| 5,114,588 | 5/1992 | Greene .................. 210/634 |

Primary Examiner—Frank Sever
Attorney, Agent, or Firm—Arthur Freilich; Robert D. Hornbaker; Leon D. Rosen

[57] ABSTRACT

A rotary filtration apparatus is provided, of the type which includes a multiplicity of membrane packs arranged in a stack on a rotor frame, which facilitates replacement of membrane packs. A membrane pack assembly (16, FIG. 1) includes a multiplicity of membrane packs arranged in a stack between a pair of stack plates (70, 72), and held in compression by several tension members (80) spaced about the pack and coupled to the plates. The rotor frame (14) has top and bottom frame plates (50, 52) and a plurality of tying members (40) tying peripheral portions of the plates together. A sufficient number of the tying members are removable to leave an opening in the frame periphery that is large enough to allow the precompressed membrane stack assembly (16) to be moved radially into the rotor frame, at which time the removed tying members are replaced. The membrane packs can be stacked within a group of tying members (234, FIG. 10), and can be compressed by a compressor (280, FIG. 11) that includes a tension member (282) extending through center holes in the membrane packs.

5 Claims, 5 Drawing Sheets

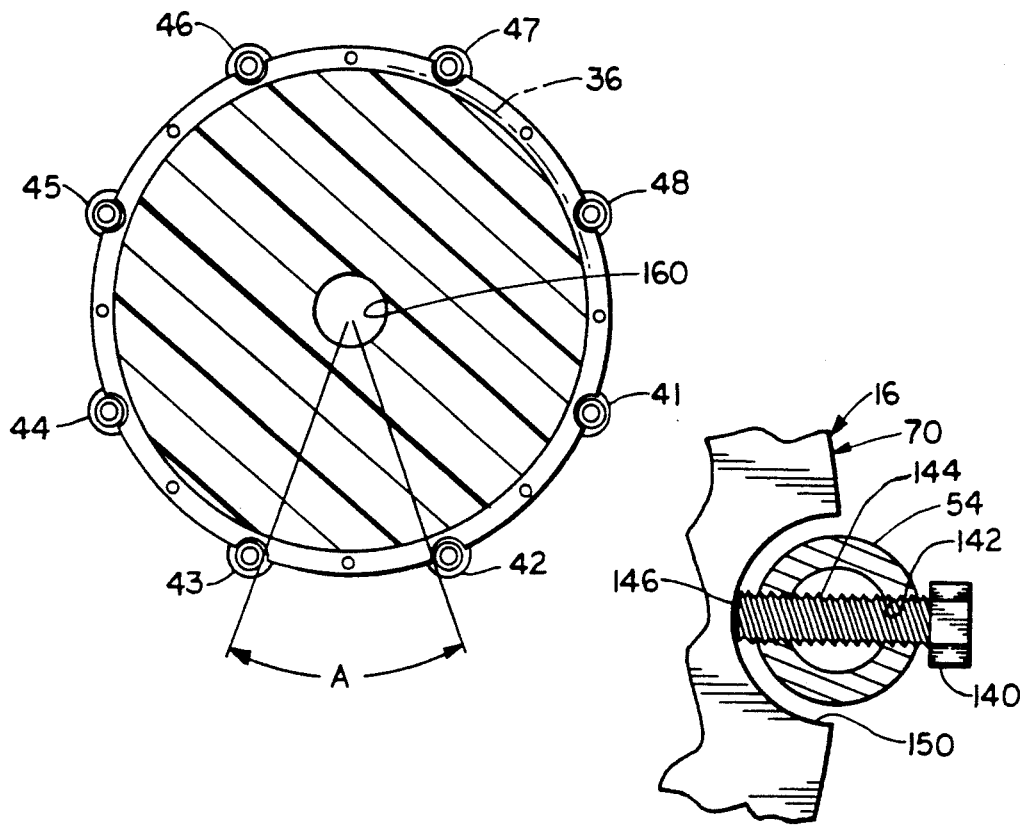
FIG. 4
FIG. 5
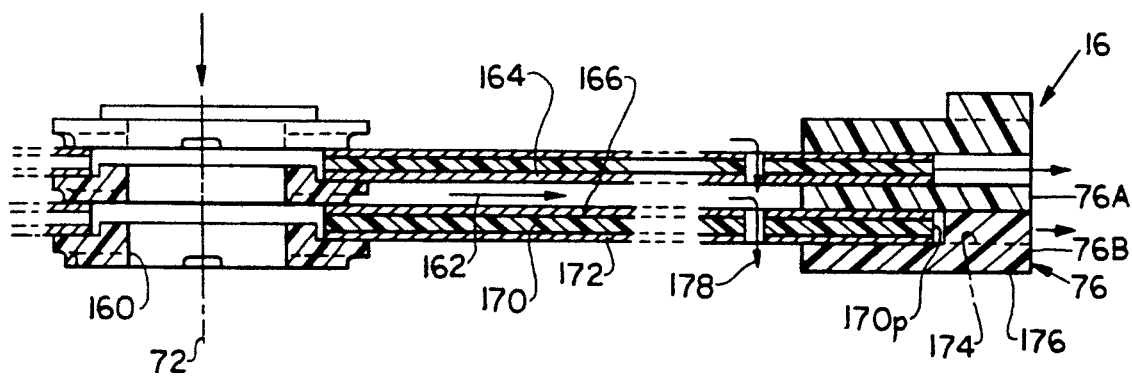
FIG. 6
PRIOR ART

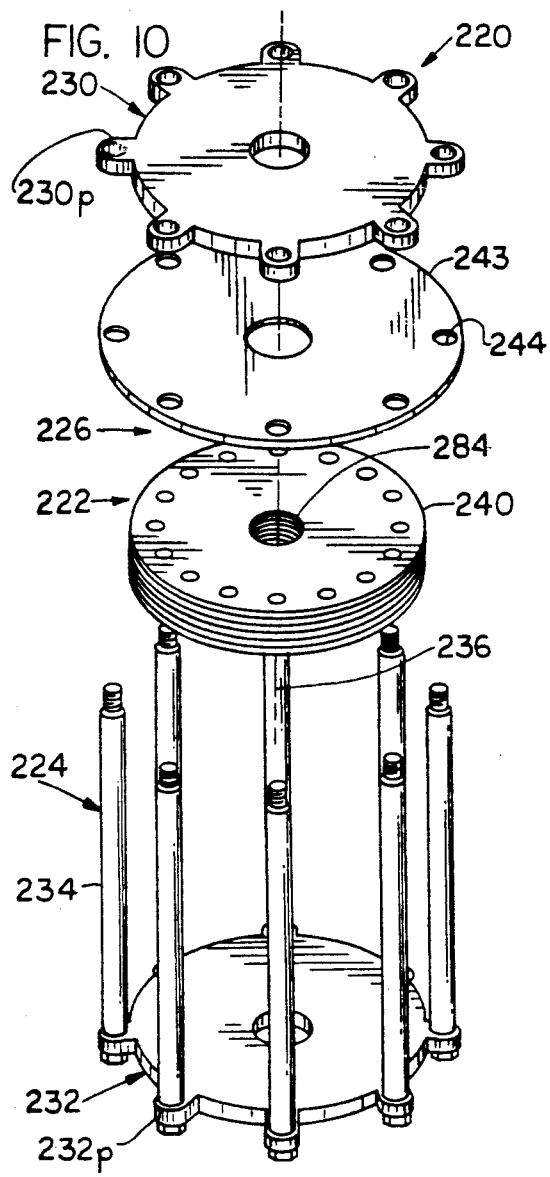
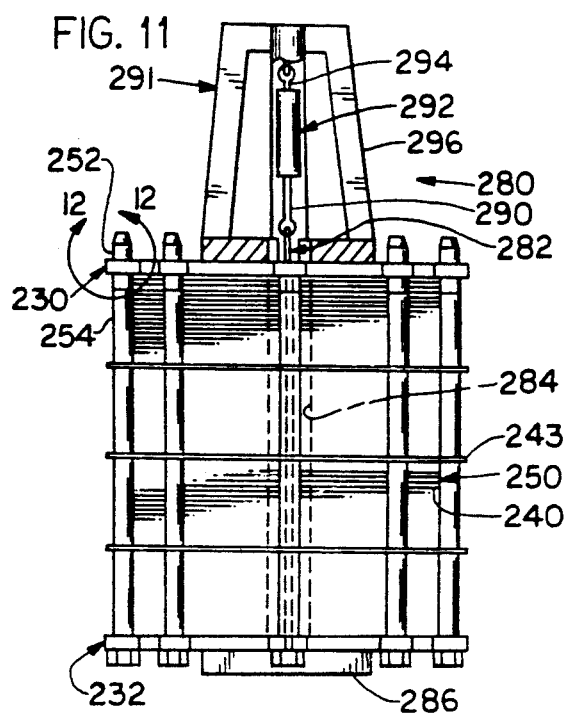
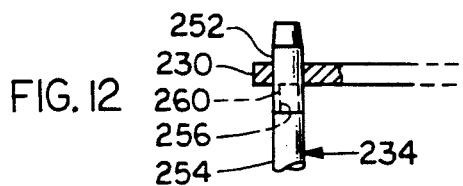
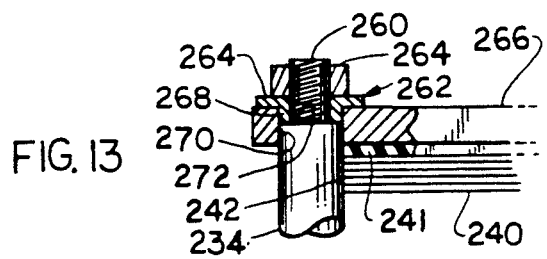
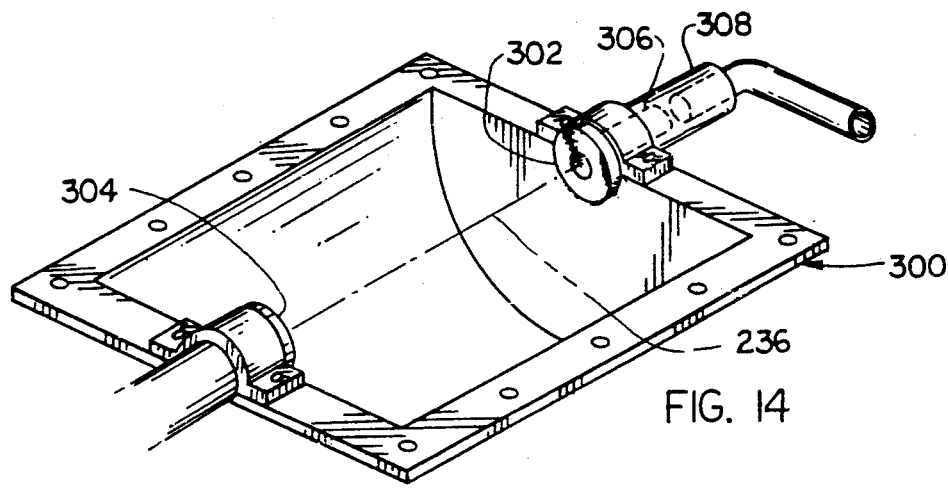

EASILY REPLACEABLE ROTOR MEMBRANE PACK

BACKGROUND OF THE INVENTION

The purification of waste water or other fluids can be accomplished by feeding the fluid under pressure against membranes arranged in a stack, with pure water or other permeate passing through the membranes for recovery while the rest of the fluid, or concentrate, is also removed from the stack. It is well known that rapid rotation of the stack produces the desirable result of creating centrifugal forces that pressurize the feed fluid, helps in the radial outflow of permeate that has passed through the membranes, and helps sweep away material that could block the membranes. U.S. Pat. No. 4,025,425 by Croopnick et al describes apparatus of this type.

A commercial centrifugal purification apparatus may include perhaps three hundred membrane packs arranged in a stack within a rotor frame. When there is a considerable decrease in membrane pack efficiency, as where the membrane pores have been largely blocked, or where there is substantial leakage in the packs, several membrane packs or the entire stack may have to be replaced. With current designs, this requires removing the rotor frame from its bearings, removing a shroud and end plate from the rotor frame to gain access to the membrane stack, removing the membrane packs from the rotor, and installing a new group of membrane packs. Currently, it requires about two days to replace the membrane packs. A large part of the labor is involved in accurately aligning the membrane packs with the axis of the rotor frame, mounting the rotor frame on its bearings, and checking the rotatable fluid seals that connect rotatable pipes on the frame to stationery pipes. Not only is there considerable cost for services in replacing the membrane packs, but the equipment is shut down for perhaps two days, which can disrupt operations dependent upon the filtration apparatus. A rotary filtration apparatus which facilitated replacement of membrane packs, so they could be replaced in a much shorter period of time than at present, would be of considerable value.

SUMMARY OF THE INVENTION

In accordance with one embodiment of the present invention, a rotary filtration apparatus and method are provided which facilitates replacement of membrane packs. The apparatus includes a rotatable rotor frame having top and bottom frame plates that are tied together by tying members spaced along the peripheries of the plates. A membrane pack assembly includes a multiplicity of filtration membrane packs arranged in a stack between top and bottom stack plates. The assembly also includes a plurality of tension members spaced about the stack axis and connecting the stack plates. The tension members are under tension to hold the stack of membrane packs under compression in an easily handled unit. A sufficient number of the tying members of the rotor frame are removable, to leave an opening at the frame periphery that is large enough to receive the membrane pack assembly by radial movement through the opening.

One or more clamping devices are provided to position the membrane pack assembly so its axis is coincident with the axis of rotation of the rotor frame, to provide a balanced rotor. The rotor frame has an extendable fluid coupling which is moveable axially against an end of the membrane pack assembly to provide a water tight coupling between a fluid coupling on the rotor frame and a conduit formed in the membrane pack assembly.

The novel features of the invention are set forth with particularity in the appended claims. The invention will be best understood from the following description when read in conjunction with the accompanying drawings.

BRIEF DESCRIPTION OF THE DRAWINGS

FIG. 4 is a view taken on the line 4—4 of FIG. 3, but not showing the permeate-capturing shroud.

FIG. 5 is a partial sectional view of the apparatus of FIG. 1, showing a positioning apparatus thereof.

FIG. 6 is a sectional view of a portion of the membrane pack assembly of FIG. 1, constructed in accordance with the prior art.

FIG. 10 is a partial, exploded view of the rotor of a rotary filtration apparatus constructed in accordance with another embodiment of the invention.

FIG. 11 is a side elevation view of the rotor of FIG. 10, showing how it is compressed.

FIG. 12 is a view of the region 12—12 of FIG. 11.

FIG. 13 is a sectional view of the region of FIG. 12, after the guide has been removed and a washer and nut have been installed.

FIG. 14 is a partial perspective view of a support that can support the rotor of FIG. 10.

DESCRIPTION OF THE PREFERRED EMBODIMENTS

Figure 1:
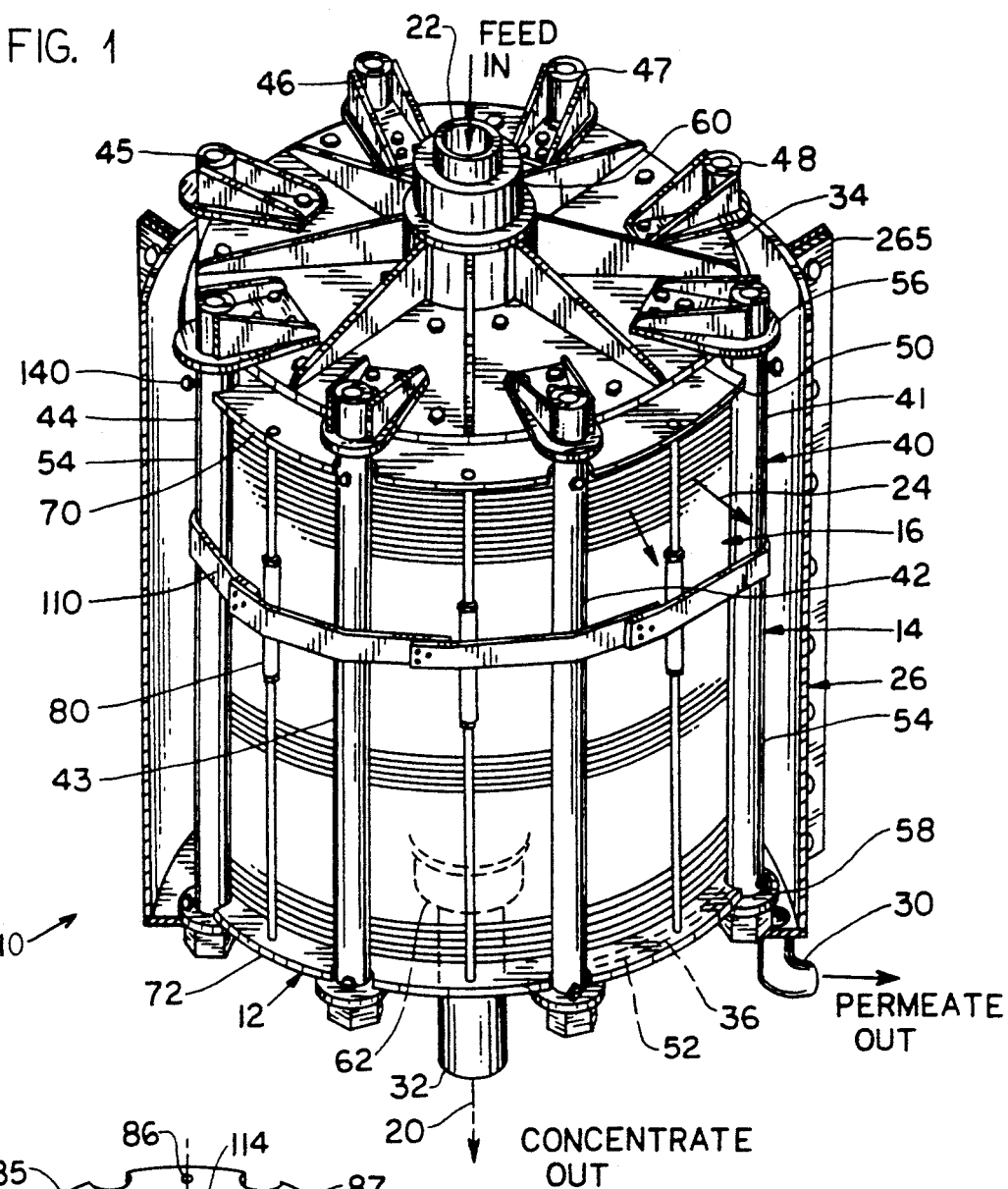
FIG. 1 is an isometric view of a rotary filtration apparatus constructed in accordance with the present invention.

FIG. 1 illustrates a rotary filtration apparatus 10 which includes a rotor 12 comprising a rotor frame 14 and a membrane pack assembly 16 mounted on the frame. The rotor frame with the pack assembly thereon rotates rapidly about a frame axis 20 while feed fluid to be purified enters an inlet 22. The feed fluid passes across numerous membranes of the pack assembly 16, with the membranes allowing only a certain component of the feed fluid, such as pure water, to pass through it, such passing fluid being called permeate. The permeate flies out of the membrane pack assembly as indicated by arrows 24, and is captured by a shroud 26 that surrounds the rotor. The permeate exits the apparatus through a permeate outlet 30. The original feed fluid, less the permeate that has been taken out, forms a concentrate that exits the apparatus through a concentrate outlet 32.

The rotor frame has top and bottom frame parts in the form of frame plates 34, 36 which are tied together by eight tying members 40 that are individually labeled 41–48. The tying members are spaced about the frame axis 20 and are attached to peripheral portions 50, 52 of the top and bottom frame plates. The particular tying members shown each includes a rod 54 with top and bottom ends attached to flanges 56, 58 that are attached to their respective frame plates. The rotor frame formed by the top and bottom plates and the tying members connecting them, is a rigid structure that is rotatably mounted on top and bottom bearings 60, 62, with the inlet 22 and outlet 32 passing through the centers of the bearings. The bearings 60, 62 and shroud 26 are parts of a stationary support 68 on which the rotor rotates.

Figure 2:
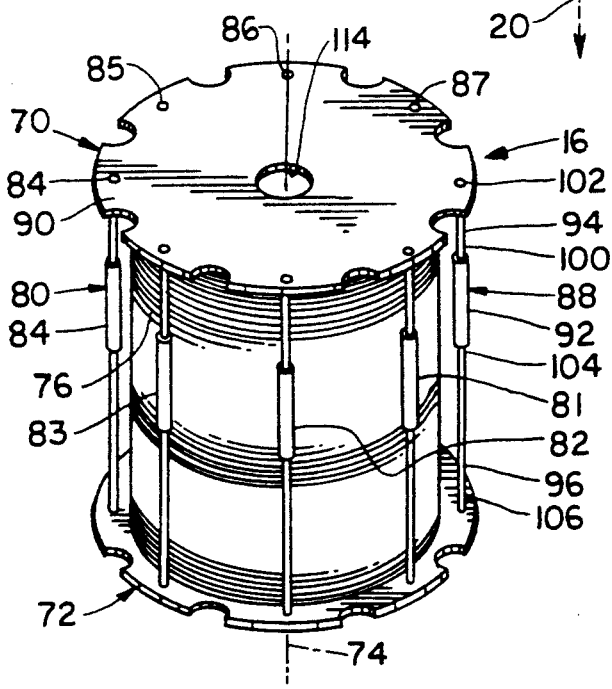
FIG. 2 is an isometric view of the membrane pack assembly of the filtration apparatus of FIG. 1.

The membrane pack assembly 16, shown in FIG. 2 apart from the rotor frame, includes top and bottom stack plates 70, 72 that are spaced apart along a stack axis 74. A multiplicity of filtration membrane packs 76 are arranged in a stack between the stack plates 70, 72. A group of eight tension members 80 labeled 81–88 are spaced about the stack axis, 74 and connect to the stack plates at peripheral portions 90 of the plates. The particular tension members 80 illustrated are turnbuckle types which each includes a turnbuckle 92 and upper and lower rods 94, 96. The upper rod 94 has a lower end 100 threadably connected to the turnbuckle 88 and an opposite upper end 102 threadably connected to the top stack plate 70. The lower rod 96 similarly has an upper end 104 threadably engaged with the turnbuckle and a lower end 106 threadably connected to the lower stack plate. Such turnbuckle arrangements are well known in the prior art, and each has a nut at its upper and lower ends, and the nuts of the turnbuckles can be turned to apply a desired amount of tension to the stack of membrane packs.

The membrane pack assembly 16 is assembled as an independent unit outside the rotor frame. Prior to installation of a membrane pack, at least one shroud section 26s is removed. To install the pack assembly 16 on the rotor frame, some of the tying members 40 of the rotor frame are removed, to leave one side of the rotor frame, between the upper and lower frame plates, open sufficiently to allow the membrane pack assembly to be slid sidewardly or radially (with respect to the frame axis 20) into the rotor frame. For the particular apparatus illustrated, four of the tying members such as 41–44 (see FIG. 4) are removed. The membrane packs assembly 16, as a unit, is slid into position between the frame plates 34, 36 (FIG. 1) until the stack axis 74 of the membrane pack assembly is substantially coincident with the frame axis 20. Then the tying members 41–43 which were removed are reinstalled. A containment strap device 110 is attached around the tying members 40 of the rotor frame and the tension members 80 of the membrane pack assembly, primarily to limit outward deflection of the turnbuckles of the tension members. The membrane pack assembly 16 is shifted radially (with respect to the frame axis 20) and/or balancing weights are applied, to balance the entire rotor. Then final fluid connections are made between the rotor inlet 22 and a membrane pack inlet 114, and the top stack plate of the pack assembly may be clamped in place. A membrane pack outlet 116 is automatically sealed to the bottom pipe outlet 32. It may be noted that the inlet and outlet can be concentric and lie at only one end of the rotor.

Figure 3:
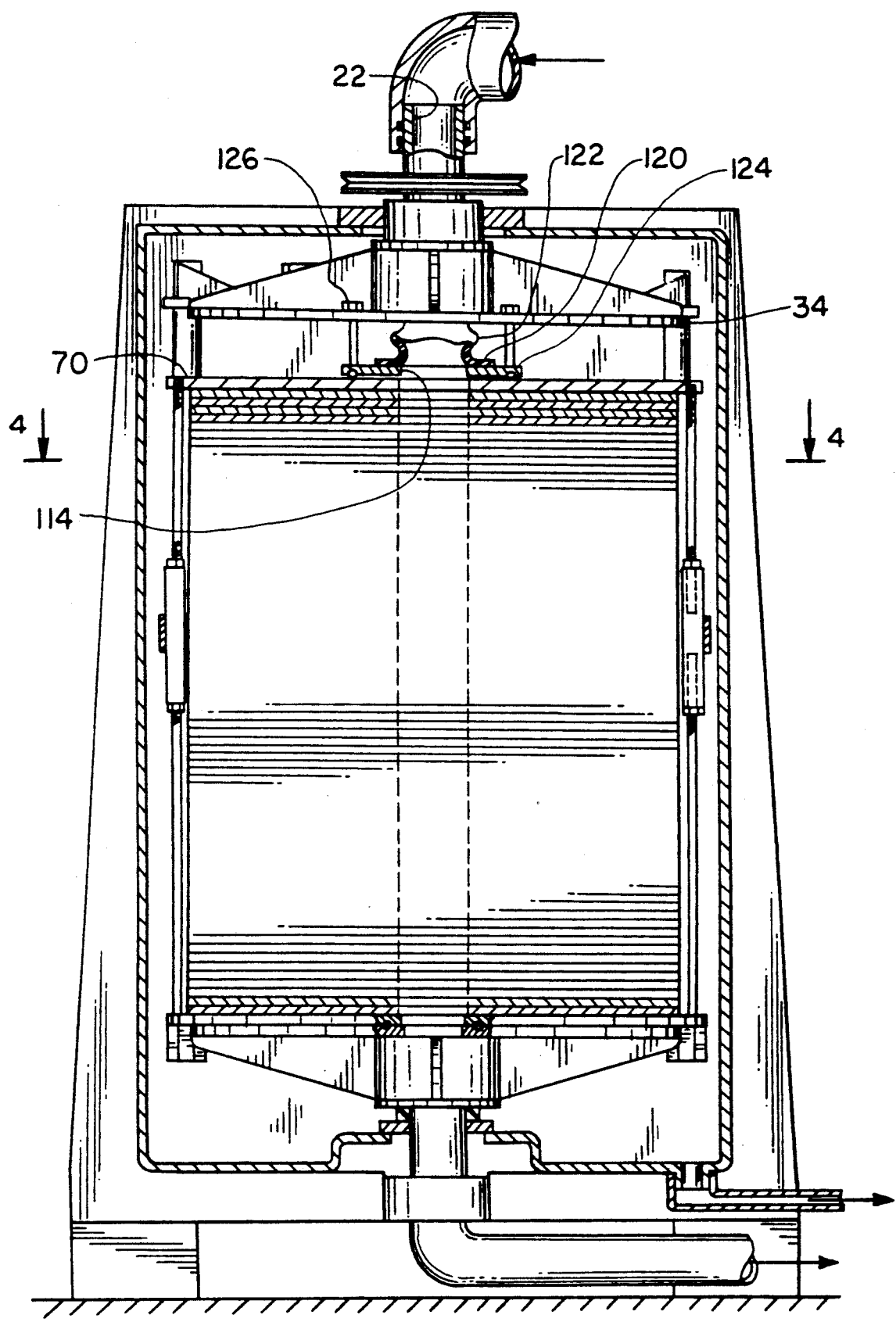
FIG. 3 is a sectional side view of the filtration apparatus of FIG. 1.
Figure 8:
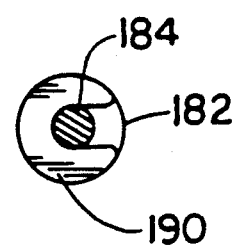
FIG. 8 is a view taken on the line 8—8 of FIG. 7.

As illustrated in FIG. 3, the rotor frame has an extendable fluid coupling 120 which is moveable down against the membrane pack top stack plate 70 to form a fluid tight seal between the rotor inlet 22 and the membrane pack inlet 114. The particular fluid coupling shown includes a bellows 122 forming an extendable conduit, with the lower end of the bellows attached to a pressure plate 124. A group of bolts 126 threadably engaged with the top rotor frame plate 34 can be screwed down to push the pressure plate 124 and an O ring seal thereon against the top stack plate 70 to form a fluid tight seal between them. Of course, other extendable fluid couplings can be used, including telescoping types that may seal to the top of the membrane pack assembly or to the inside of the hole forming the membrane pack top inlet.

In the apparatus shown in FIG. 3, a clamping device 130 is provided which is moveable downwardly to clamp the top frame plate 34 to the top stack plate 70 to prevent axial and radial movement of the membrane stack assembly with respect to the rotor frame. A group of bolts 132 threadably connected with the top frame plate 34 screws down against the clamping plate 130.

In order to enable radial adjustment of the membrane pack assembly with respect to the rotor frame, applicant provides a plurality of stack positioning screws 140 (FIG. 1) on the rods 54 of the tying members, at locations to press against the top and bottom stack plates 70, 72. As shown in FIG. 5 the rod 54 of each tying member has a radially-extending threaded hole 142 which receives a positioning screw 140. The positioning screw has a threaded shank 144 with a radially inner end 146 that bears against the stack top plate 70, at a location within a top plate cutout 150 which receives the rod 54 of the tying member. When the screw 140 is tightened, it shifts the top stack plate 70 in a particular radial direction. By adjusting all sixteen positioning screws 140, applicant can slightly shift the radial position of the membrane pack assembly with respect to the rotor frame, and clamp the pack assembly in place. If the clamping device 130 (FIG. 3) is also used, then the clamping device is clamped after the positioning devices have positioned the membrane pack assembly.

FIG. 6 shows some details of the membrane packs 70 of the stack assembly. The membrane packs 70 are of a prior art type, such as described in U.S. Pat. No. 4,132,649. Basically, feed fluid moves through a central conduit 160 formed by central holes in the packs, and moves radially outwardly along the direction of arrows 162 between membranes such as 164, 166 of a pair of membrane packs 76A, 76B. Each membrane such as 166 is part of a membrane assembly of a pack 76B that includes a central sheet 170 with radial flow channels therein, sandwiched between a pair of membranes 166, 172. Feed fluid moving along the path 162 becomes highly pressurized by centrifugal force, as the pack assembly is rapidly rotated about the axis 72. The permeate component of the feed fluid permeates through the membrane 166 into the central sheet 170, and flows radially outwardly along the central sheet to the periphery 170p of the central sheet. From there, the permeate passes through a passage 174 in a gasket 176, to fly out of the rotor and be collected by the permeate-collecting shroud. That portion of the feed fluid which does not permeate the membranes, becomes concentrate that passes along the path 178 through holes in the membrane packs, to exit through the concentrate outlet of the rotor. Other types of membrane packs can be used, such as those with multiple radially-extending hollow fiber-like membranes.

It is important that the membrane packs, and especially the gaskets 176 of the packs be sufficiently compressed to prevent leakage of high pressure fluid; however, the pressure must not be so great that it will tear the membranes. The fact that the present invention allows the membrane packs to be stacked and precompressed outside of the rotor frame, results in easier stacking and precompressing to the proper amount of compression. Also, when leakage is discovered in the membrane pack assembly or the membranes have become sufficiently blocked that a new membrane pack assembly is required, down time of the filtration apparatus is minimized. This is because membrane packs do not have to be individually stacked and aligned in the rotor frame, or compressed to the proper level within the rotor frame. Also, since the membrane packs do not have to be moved into the rotor frame along the axis of the rotor frame, the bearings that support the rotor frame and seals that seal to shafts do not have to be removed and later realigned. Furthermore, the number of membrane packs that can be accommodated within a rotor is increased, because of a decrease in height of the compressed stack. In a membrane pack assembly that applicant has tested, which included three hundred membrane packs with an initial height of fifty inches, the stack compressed down to a height of forty four inches, or twelve per cent, when fully compressed.

Figure 7:
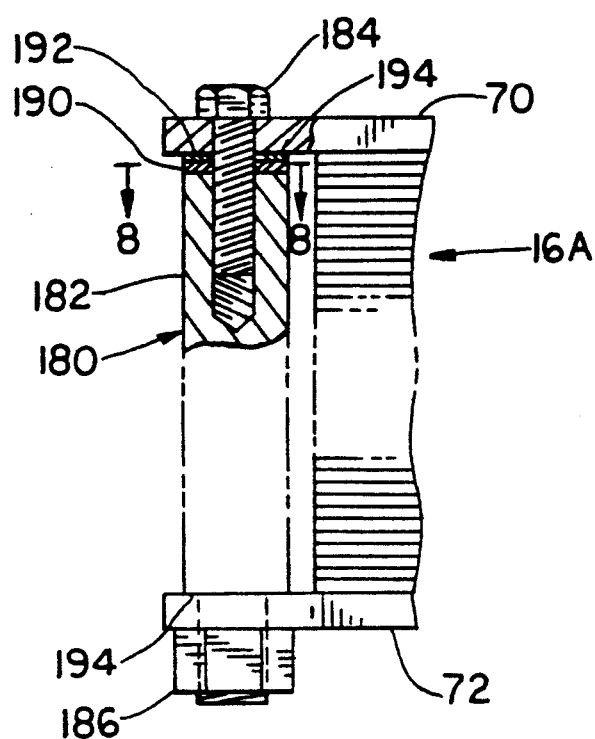
FIG. 7 is a partial sectional view of a membrane pack assembly constructed in accordance with another embodiment of the present invention.

FIG. 7 illustrates a portion of a membrane pack assembly 16A constructed in accordance with another embodiment of the invention, which includes tension members 180 of a different construction. Each tension member 180 includes a bar 182 with threaded holes in its opposite ends, and bolts 184, 186 that pass through the top and bottom stack plates 70, 72 and screw into the holes. Shims 190, 192 are used to adjust the lengths of the rods to obtain the desire rod tension and therefore pack compression. The bars 182 (with shims) have shoulders 194 at their ends that abut the stack plates, to serve as columns that resist excess compression, so that if the membrane pack assembly is compressed after installation in the rotor frame, the bars will take up the added compression force (and be under less tension or even moderate compression) and limit compression, as overcompression can restrict flow or damage the membrane packs.

Figure 9:
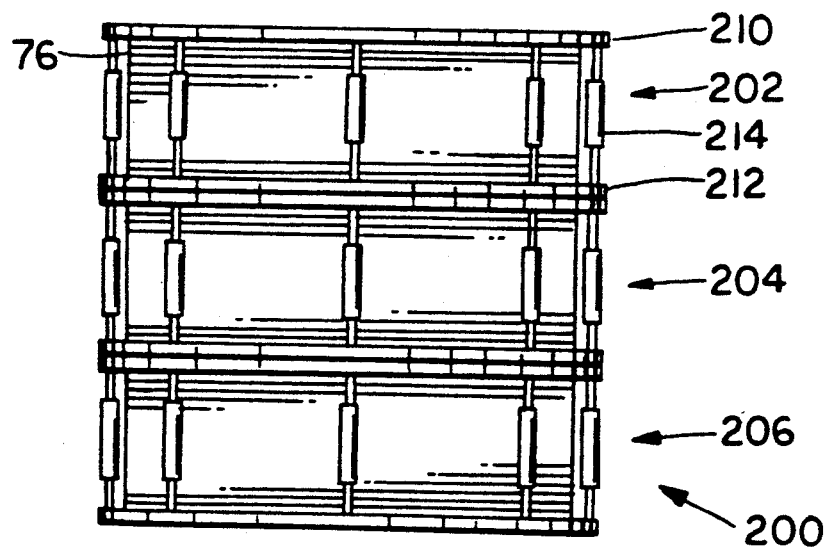
FIG. 9 is a side elevation view of a membrane pack assembly constructed in accordance with another embodiment of the invention.

FIG. 9 illustrates another membrane pack assembly 200 which includes a plurality of subassemblies such as 3 labeled 202-206. Each subassembly such as 202 includes top and bottom plates 210, 212 and tension members 214 tying the plates together and holding the membrane packs 76 between the plates, in compression. Each subassembly such as 202 is assembled individually, and the group of perhaps three subassemblies are moved radially into a rotor frame and stacked on one another therewithin, in the same manner as the pack assembly of FIG. 2. The advantage of providing two or more subassemblies, is that it reduces the cost of removing a leaking membrane pack. Instead of removing an assembly containing perhaps 300 membrane packs, applicant has to replace only one subassembly containing perhaps 100 membrane packs. Of course, a larger number of subassemblies may be used such as fifteen with each including twenty membrane packs in order to load 300 membrane packs into a rotor.

A variety of different construction approaches can be taken in constructing the rotor. For example, the tying members can include only two or three tying members, that each subtend an angle of 180° or 120°, instead of using the rods illustrated which each subtend an angle of only about 7° and that leave most of the periphery of the rotor open. It is possible to use only radial positioning apparatus of the type illustrated at 140 in FIG. 5, to hold the membrane pack assembly in the desired radial position as well as to prevent it from moving axially, so that a clamping device for clamping against a stack plate is not required. It should also be noted that the rotor can be oriented in any position with respect to gravity, and terms such as "top" and "bottom" are used herein only to aid in understanding the invention. However, the axis of the rotor is usually horizontal.

The angular opening at the periphery of the rotor frame required to enable the membrane pack assembly to be moved radially into or out of the opening, depends on the relative diameter of the membrane pack assembly to that of the frame opening. In an extreme case, where the pack assembly had half the diameter of a circle on which the tying members lie, the opening angle could be as little as 60°. With eight tying members, as shown in FIG. 4, the angle A between tying members is about 40°. The tying members together occupy much less than half of the periphery of the rotor frame.

FIGS. 10-14 illustrate another rotary filtration apparatus 220, which includes a rotor 222 comprising a rotor frame 224 and a membrane pack assembly 226 mounted on the frame (only a portion of the membrane pack assembly is shown in FIG. 10). The rotor frame has first and second end plates 230, 232 and has several tying members 234 spaced about the frame axis 236 and tying together locations along peripheral portions 230p, 232p of the end plates. A plurality of membrane packs 240 are arranged in a stack between the end plates with an elastomeric gasket 241 (FIG. 13) at each end plate. The membrane packs each have an edge 242 that substantially abuts the tying members 234, so the tying members determine the radial positions of the membrane packs with respect to the axis 236 of the rotor.

The rotor is assembled with the tying members 234 rigidly attached to the second plate 232 as shown in FIG. 10, but with the first end plate 230 removed. Membrane packs 240 are dropped into the space between the tying members 234, with the tying members serving to align the membrane packs with the axis 236 of the frame. Applicant installs a steel spacer plate 243 between groups of perhaps one hundred membrane packs, with the spacer plate having holes 244 (FIG. 10) that closely receive the tying members 234. The spacer plates serve to resist radially outward bowing of the tying members under the centrifugal forces encountered during rapid spinning of the rotor. It may be noted that, while the second end plate 232 can rest on the ground with the axis 136 vertical while the membrane packs are dropped into place, it is also possible to orient the second end plate 232 so the axis 236 is inclined from the vertical or even horizontal. After the membrane packs and spacer plates have been installed, the first end plate 230 (and a gasket) is installed on the tying members to complete the assembly. If there are gaps between the tying members and membrane packs, the tying members can be provided with shims to abut or lie very close to the membrane packs.

The stack 250 (FIG. 11) of membrane packs must be compressed in length, as described above, so that a stack that is initially of a length or height of 54 inches may have to be compressed by four inches to its final compressed length. Applicant provides a plurality of temporary guides 252 that temporarily fit onto the first ends 254 of some or all of the tying members, to act as an extension that guides the membrane packs along a length greater than that of the guiding parts of the tying members, and which guides the membrane packs during their compression. As shown in FIG. 12, each guide 252 has an internally threaded hole 256 which receives a threaded stub 260 formed at the first end 254 of the tying member. When the stack has been compressed, the temporary guides 252 are unscrewed. Then, as shown in FIG. 12, a washer 262 is inserted over the stub 260 and a nut 264 is screwed onto the stub 260 to complete the assembly of the membrane packs, the end plates, and tying members.

Each washer 262 has a flange portion 264 that rests between an upper surface 266 of the first end plate and the nut 264, in the manner of common washers. Each washer also includes a narrow portion 268 that fits into a hole 270 of the first end plate to assure that the washer will abut the tip 272 of the widest portion of each tying member, so as to assure maintenance of a predetermined amount of membrane pack compression. Different size washers are provided, with different sizes of washers having narrow parts 268 of differing heights, so as to enable slight variation in the amount of compression of the membrane packs. It is noted that less than optimum membrane pack compression can lead to leakage, while excessive membrane pack compression can result in tearing of the membrane packs, with the different lengths or thicknesses of narrow washer portions 268 enabling fine adjustment of the amount of compression.

As indicated in FIG. 11, applicant prefers to compress the stack 250 of membrane packs (with spacer plates 243 and gaskets therein) by using a compressor that can be easily set up in the field. The compressor 280 includes a tension member 282 that extends through the central holes 284 of the membrane packs and spacers. One end of the tension member is coupled to an abutment 286 that abuts the second end plate 232 (an additional plate may lie between them). The other end of the tension member is coupled to a compression assembly 291. The compression assembly includes an actuator 292 with one end 290 connected to an opposite end of the tension member. The other end 294 of the actuator is coupled through a compression coupling 296 that withstands compression, to the first end plate 230. The actuator 292, which may be a hydraulic type that has a piston moveable by hydraulic pressure within a cylinder, is reduced in length to cause the coupling 296 and abutment 286 to draw the end plates towards one another and thereby compress the stack of membrane packs. When the stack is compressed, the temporary guides 252 are removed, the washers of correct length are installed, and the nuts 264 are tightened. The actuator end 290 can be detached from the tension member 282, which allows removable of the compressor 280 from the assembled rotor.

All parts of the compressor 280 are portable items, with the only addition being an hydraulic pump for supplying pressured hydraulic fluid to the actuator 292, with hydraulic pumps of relatively small size being readily available. As a result, assembly of the rotor can be easily accomplished in the field, which reduces the down time of machinery and the cost for replacing a stack of membrane packs.

FIG. 14 illustrates a support 300 which can be used to rotatably support the rotor. The support has flanges 302, 304 that attach to corresponding flanges (not shown) on the end plates of the rotor. The flange 302 is attached to a tube 306 that passes through a rotatable fluid coupling 308 that allows the flange 302 to be moved a small amount axially, along the axis 236, to enable attachment to the rotor. It may be noted that the rotation axis 236 of the rotor is generally horizontal, but can be vertical.

Thus, the invention provides rotary filtration apparatus that facilitates replacement of membrane packs. In one arrangement, the membrane packs are arranged in a stack that is precompressed before installation in the rotor frame. The rotor frame includes a plurality of tying members spaced about its periphery, and a sufficient number (one or more) of the tying members are temporarily removed to enable the membrane pack assembly to be moved sidewardly, or in a radial direction, into the rotor frame, after which the tying members are replaced. In another arrangement, the membrane pack assembly includes top and bottom stack plates and a plurality of tension members extending between the stack plates and causing them to keep the stack of membrane packs in compression. The membrane packs have central holes, and the stack can be readily compressed in the field by a compressor that includes a tension member that passes through the holes to extend between opposite ends of the stack.

Although particular embodiments of the invention have been described and illustrated herein, it is recognized that modifications and variations may readily occur to those skilled in the art, and consequently it is intended that the claims be interpreted to cover such modifications and equivalents.

I claim:

1. A rotary filtration apparatus comprising:
   a rotor frame which is rotatable about a frame axis and which has first and second frame end plates with peripheral plate portions, said frame also having a plurality of tying members spaced about said frame axis and tying together locations along peripheral portions of said first and second end plates;
   a plurality of membrane packs arranged in a stack between said end plates, with said tying members determining the radial positions of said plurality of membrane packs with respect to said axis;
   said first end plate being removable from said tying members and said tying members being fastened rigidly enough to said second plate so said tying members extend parallel to each other when said first end plate is removed, to allow membrane packs to be inserted within said tying members to stack them in alignment with each other and said rotor frame.

2. The apparatus described in claim 1 wherein:
   said tying members have first ends that are attachable to said first end plate, and said first end plate has a plurality of holes that each receives the first end of said tying members; and including
   a plurality of temporary guides, each having an inner end that is attachable to the first end of one of said tying members and which is of substantially the same outside diameter as said tying member first end, to serve as an extension thereof that enters one of said hoes in said first end plate to guide it in movement toward said second end plate as sad stack of membrane packs is compressed, until said tying member first ends pass into said holes of said first end plate and can be fastened thereto.

3. The apparatus described in claim 1 wherein:
   said first and second end plates and said membrane packs each having holes in their centers that lie on said axis; and including
   an in-field stack compressor which includes a tension member that has opposite ends and that can extend through said stack of membrane packs and said end plates, an abutment that is coupled to one end of said tension member and abuts one of said end plates, and an actuator assembly that is coupled to the other end of said tension member and abuts the other end of said end plates, said actuator assembly applying sufficient tension to said tension member to compress said membrane pack until said tying members can be easily attached to said second plate to keep said stack in compression when said stack compressor is removed.

4. A method for installing a plurality of filtration membrane packs that have central holes lying on an axis, in a rotor frame which includes first and second end plates and a plurality of tying members that tie said end plates together, wherein the rotor frame is designed to be rotated about said axis, comprising:

establishing a stack of membrane packs between said end plates, compressing said stack by pressing said end plates together, and holding said stack in compression with said tying members;

said step of compressing including projecting an elongated tension member through said holes in said membrane packs, coupling a first end of said tension member to one of said end plates and coupling a second end of said tension member through an acutator to the other of said end plates, and operating said actuator to apply tension to said tension member which compresses said stack.

5. The method described in claim 4 wherein:

said first end plate has holes near its periphery that closely receive said tying members; and including attaching guides to the ends of said tying members that lie opposite said second end plate, wherein said guides have substantially the same outside diameters as said tying members to serve as extensions of said tying members;

said step of compressing includes guiding said first end pate initially along said guides, and when said stack is substantially fully compressed removing said guides before fastening said tying members to said first end plate.

* * * * *